United States Patent
Daisey, Jr. et al.

(10) Patent No.: US 6,664,327 B2
(45) Date of Patent: Dec. 16, 2003

(54) AQUEOUS COMPOSITION FOR WOOD STAIN

(75) Inventors: George Irwin Daisey, Jr., Elmer, NJ (US); Willie Lau, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 26 days.

(21) Appl. No.: 10/037,210

(22) Filed: Jan. 4, 2002

(65) Prior Publication Data

US 2002/0128367 A1 Sep. 12, 2002

Related U.S. Application Data

(60) Provisional application No. 60/260,699, filed on Jan. 10, 2001.

(51) Int. Cl.$^7$ ................................................. C08F 16/18
(52) U.S. Cl. ..................... 524/523; 524/502; 524/522; 524/80; 524/81; 526/72; 526/89; 427/393
(58) Field of Search ...................... 524/523, 502, 524/522, 80, 81; 526/72, 89; 427/393

(56) References Cited

U.S. PATENT DOCUMENTS

| | | | |
|---|---|---|---|
| 3,573,239 A | 3/1971 | Zdanowski | |
| 3,847,857 A | 11/1974 | Haag et al. | |
| 5,516,865 A | 5/1996 | Urquiola | |
| 5,521,266 A | 5/1996 | Lau | |
| 5,710,226 A | 1/1998 | Lau | |
| 5,760,129 A | * 6/1998 | Lau | 524/732 |
| 5,782,962 A | * 7/1998 | Burke et al. | 106/2 |
| 6,040,409 A | 3/2000 | Lau | |
| 6,235,814 B1 | 5/2001 | Bowe | |

FOREIGN PATENT DOCUMENTS

| | | | |
|---|---|---|---|
| CA | 1276338 | 11/1990 | |
| EP | 0879852 A1 | 11/1998 | |
| EP | 1035088 | 9/2000 | |
| EP | 1036835 A2 * | 9/2000 | ......... C09D/133/06 |
| EP | 1048422 | 11/2000 | |

* cited by examiner

*Primary Examiner*—David W. Wu
*Assistant Examiner*—Satya B Sastri
(74) *Attorney, Agent, or Firm*—Gary D. Greenblatt

(57) ABSTRACT

An aqueous composition is provided containing a first polymer including at least one $C_{12}$ to $C_{40}$ alkyl ester of (meth)acrylic acid, as polymerized units; at least one wax, at least one pigment, and optionally, at least one second polymer, wherein the sum of the first polymer and the second polymer is at least 10 weight %, based on weight of the aqueous composition; wherein the weight ratio of the first polymer to the second polymer is at least 1:4; and wherein the first polymer and the second polymer have a combined glass transition temperature in the range of −5 to 20° C. As provided is a method of treating a wood surface with the aqueous composition. The aqueous composition provides wood with resistance to water wetting and penetration of water and is suitable as a semi-transparent stain for wood.

10 Claims, No Drawings

AQUEOUS COMPOSITION FOR WOOD STAIN

CROSS REFERENCE TO RELATED PATENT APPLICATIONS

This is a non-provisional application of prior pending U.S. provisional application serial No. 60/260,699 filed Jan. 10, 2001.

This invention relates to an aqueous composition. In particular, this invention relates to an aqueous composition including polymers containing hydrophobic monomers as polymerized units which is useful as a stain for wood. Further, this invention relates to a method of using the aqueous composition.

Wood is used extensively in the construction of decks, fences, and other exterior structures. To protect the wood from moisture and sunlight, the wood is often treated with a stain or sealer which reduces the penetration of moisture into the wood. The stain or sealer provides protection to the wood by sealing the wood pores on the surface of the wood and by minimizing wetting of the wood surface. The formation of water drops on the surface of the treated wood, commonly referred to as "beading", indicates resistance to water wetting and penetration into the wood. Besides providing protection to the wood, a stain or sealer may be applied to improve the appearance of the wood. Pigmented stains, commonly referred to as "semi-transparent" stains may be used to provide a desired color to the wood. Stains and sealers are often re-applied to wood on time intervals of a year or longer.

U.S. Pat. No. 6,040,409 discloses a composition containing a hydrophobic polymer which includes hydrophobic monomers as polymerized groups, a second polymer, and water. The hydrophobic polymer is useful in floor polish compositions as a wax replacement. The composition containing the hydrophobic polymer monomer composition, which optionally may include wax, provides a clear floor polish with improved repair properties and a less slippery walking surface. It is further disclosed that the composition may also be used in architectural and industrial coatings including wood coatings.

Despite the disclosure of the prior art, there is a need for stains and sealers for wood with improved water beading. Stains and sealers with improved water beading may provide improved resistance to the penetration of moisture or provide longer time intervals before the re-application of the stain or sealer. The inventors have found that compositions containing hydrophobic polymer and wax provide water beading to wood, particularly for longer periods of time than conventional stains and sealers.

The first aspect of this invention provides an aqueous composition containing: from 2 to 25 weight % first polymer, based on weight of the aqueous composition, wherein the first polymer includes as polymerized units from 20 to 100 weight % of at least one $C_{12}$ to $C_{40}$ alkyl ester of (meth)acrylic acid, based on weight of the first polymer, from 0 to 10 weight % of at least one ethylenically unsaturated acid or amide containing monomer or salts thereof, based on weight of the first polymer, and from 0 to 80 weight % of at least one ethylenically unsaturated monomer, based on weight of the first polymer; from 0.1 to 5 weight % of at least one wax, based on weight of the aqueous composition; from 1 to 20 weight % of at least one pigment, based on weight of the aqueous composition; and from 0 to 32 weight % of at least one second polymer, based on weight of the aqueous composition; wherein the sum of the first polymer and the second polymer is at least 10 weight %, based on weight of the aqueous composition; wherein the weight ratio of the first polymer to the second polymer is at least 1:4; and wherein the first polymer and the second polymer have a combined glass transition temperature in the range of −5 to 20° C.

The second aspect of this invention provides a method of treating a wood surface including the steps of preparing an aqueous composition containing: from 2 to 25 weight % first polymer, based on weight of the aqueous composition, wherein the first polymer includes as polymerized units from 20 to 100 weight % of at least one $C_{12}$ to $C_{40}$ alkyl ester of (meth)acrylic acid, based on weight of the first polymer, from 0 to 10 weight % of at least one ethylenically unsaturated acid or amide containing monomer or salts thereof, based on weight of the first polymer, and from 0 to 80 weight % of at least one ethylenically unsaturated monomer, based on weight of the first polymer; from 0.1 to 5 weight % of at least one wax, based on weight of the aqueous composition; from 1 to 20 weight % of at least one pigment, based on weight of the aqueous composition; and from 0 to 32 weight % of at least one second polymer, based on weight of the aqueous composition; wherein the sum of the first polymer and the second polymer is at least 10 weight %, based on weight of the aqueous composition; wherein the weight ratio of the first polymer to the second polymer is at least 1:4; and wherein the first polymer and the second polymer have a combined glass transition temperature in the range of −5 to 20° C.; applying the aqueous composition onto the wood surface; and drying or allowing to dry the aqueous composition.

As used herein, the term "(meth)acrylate" refers to either acrylate or methacrylate and the term "(meth)acrylic" refers to either acrylic or methacrylic. As used herein, the term "hydrophobic monomer" refers to a $C_{12}$ to $C_{40}$ alkyl ester of (meth)acrylic acid.

"Glass transition temperature" or "$T_g$" as used herein, means the temperature at or above which a glassy polymer will undergo segmental motion of the polymer chain. The $T_g$ of the first polymer and the second polymer reported herein are measured by differential scanning calorimetry.

The present invention provides an aqueous composition suitable for use as a wood stain, containing a first polymer, at least one wax, water, at least one pigment, and optionally at least one second polymer.

The first polymer contains as polymerized units from 20 to 100 weight %, preferably from 30 to 100 weight %, and more preferably from 40 to 100 weight % of at least one $C_{12}$ to $C_{40}$ alkyl ester of (meth)acrylic acid, based on the weight of the first polymer. It is further preferred that the first polymer used in this invention contains as polymerized units from 30 to 96 weight %, more preferably 40 to 93 weight % of at least one $C_{12}$ to $C_{40}$ alkyl ester of (meth)acrylic acid, based on the weight of the first polymer. It is preferred that the alkyl ester of (meth)acrylic acid is a $C_{12}$ to $C_{40}$ alkyl ester of (meth)acrylic acid. Suitable alkyl esters of (meth)acrylic acid include lauryl (meth)acrylate, cetyl (meth)acrylate, stearyl (meth)acrylate, behenyl (meth)acrylate, and eicosyl (meth)acrylate. Beneficial properties may be obtained by utilizing more than one $C_{12}$ to $C_{40}$ alkyl ester of (meth)acrylic acid.

The first polymer may further contain as polymerized units from 0 to 10 weight %, preferably 1 to 5 weight %, more preferably 1 to 3 weight %, based on the weight of the first polymer, of ethylenically unsaturated acid or amide containing monomer or salts thereof. Suitable ethylenically unsaturated acid containing monomers include, but are not limited to acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride. Acrylic acid and methacrylic acid are preferred. Methacrylic acid is more preferred. Suitable ethylenically unsaturated amide containing monomers include, but are not limited (meth)acrylamide and substituted (meth)acrylamides such as diacetone (meth)acrylamide, and mono- and di-alkyl (meth)acrylamides.

The first polymer may also contain as polymerized units from 0 to 80 weight %, preferably from 0 to 50 weight %, and more preferably 1 to 40 weight %, based on the weight of the first polymer, of at least one ethylenically unsaturated monomer wherein the ethylenically unsaturated monomer is not a $C_{12}$ to $C_{40}$ alkyl ester of (meth)acrylic acid and is not a ethylenically unsaturated acid or amide containing monomer or salts thereof. Suitable ethylenically unsaturated monomers for use in the preparation of the first polymer include, but are not limited to (meth)acrylic ester monomers including methyl acrylate, ethyl acrylate, butyl acrylate, 2-ethylhexyl acrylate, decyl acrylate, methyl methacrylate, and butyl methacrylate; hydroxyalkyl esters of (meth)acrylic acid such as hydroxyethyl (meth)acrylate and hydroxypropyl (meth)acrylate; styrene or substituted styrene; vinyl acetate or other vinyl esters; vinyl monomers such as vinyl chloride, vinylidene chloride, N-vinyl pyrrolidone; and (meth)acrylonitrile. Other suitable ethylenically unsaturated monomers include $C_6$ to $C_{20}$ alkyl styrene and alkyl-α-methyl styrene, $C_6$ to $C_{10}$ alkyl dialkyl itaconate, $C_8$ to $C_{20}$ N-alkylacrylimide, and $C_{10}$ to $C_{20}$ alkyl vinylether. Butyl acrylate, methyl methacrylate, and styrene are preferred. Most preferred are butyl acrylate and methyl methacrylate.

Other suitable ethylenically unsaturated monomers include fluorinated monomers such as 0 to 80 weight %, preferably 0 to 50 weight %, most preferably 1 to 15 weight % of a fluorinated (meth)acrylate ethylenically unsaturated monomer, such as those sold under the trademark Zonyl™ (Trademark of DuPont Chemical Company) and silicone containing monomers such as 0 to 80 weight %, preferably 0 to 50 weight %, more preferably 1 to 15 weight % of a silicone containing ethylenically unsaturated monomer, such as vinyl trimethoxy silane and methacryloxy propyl trimethoxy silane. Further other suitable ethylenically unsaturated monomers include cross-linking monomers. Cross-linking monomers include multiethylenically unsaturated monomers and "latent" crosslinkers such as acetoacetate-functional monomers such as acetoacetoxyethyl acrylate, acetoacetoxypropyl methacrylate, acetoacetoxyethyl methacrylate, allyl acetoacetate, acetoacetoxybutyl methacrylate, and 2,3-di(acetoacetoxy)propyl methacrylate; divinyl benzene, (meth)acryloyl polyesters of polyhydroxylated compounds, divinyl esters of polycarboxylic acids, diallyl esters of polycarboxylic acids, diallyl dimethyl ammonium chloride, triallyl terephthalate, methylene bis acrylamide, diallyl maleate, diallyl fumarate, hexamethylene bis maleamide, triallyl phosphate, trivinyl trimellitate, divinyl adipate, glyceryl trimethacrylate, diallyl succinate, divinyl ether, the divinyl ethers of ethylene glycol or diethylene glycol diacrylate, polyethylene glycol diacrylates of methacrylates, 1,6-hexanediol diacrylate, pentaerythritol triacrylate or tetraacrylate, neopentyl glycol diacrylate, allyl methacrylate, cyclopentadiene diacrylate, the butylene glycol diacrylates or dimethacrylates, trimethylolpropane di- or tri-acrylates, (meth)acrylamide, n-methylol (meth)acrylamide and mixtures thereof. The amount of cross-linking monomer utilized may range from 0 to 10 weight %, preferably from 0.1 to 5 weight %, and is chosen such that the cross-linking monomer does not materially interfere with film formation.

The types and the levels of the hydrophobic monomers, the optional ethylenically unsaturated acid or amide monomers, and the optional at least one ethylenically unsaturated monomers are chosen to provide a first polymer composition with a glass transition temperature in the range of −20° C. to 50° C., preferably in the range of −12° C. to 40° C., and most preferably in the range of −10° C. to 30° C. In an aqueous composition not containing a second polymer, the first polymer preferably has a glass transition temperature in the range of −5° C. to 20° C.

Chain transfer agents may be used to control the molecular weight of the first polymer used in this invention. Suitable chain transfer agents include mercaptans, such as, for example, dodecylmercaptan. The chain transfer agent may be used at from 0% to 10%, preferably from 0.1 to 5%, based on the total weight of the first polymer.

The first polymer used in this invention may be prepared by a single stage or a multi-stage polymerization process. In a polymerization process involving more than one stage, the composition ranges described herein referred to weight based on the total weight of first polymer. The polymerization process may be emulsion polymerization. See Pat. No. 5,521,266 for a detailed description of emulsion polymerization processes. The polymerization process may also be solution polymerization followed by emulsification and may involve a solvent removal step. See U.S. Pat. No. 5,539,021 for detailed descriptions of a solution polymerization followed by mini-emulsion polymerization or micro-emulsion polymerizations. A preferred process is emulsion polymerization in the presence of a macromolecular organic compound having a hydrophobic cavity as disclosed in U.S. Pat. No. 5,521,266. Suitable macromolecular organic compounds having a hydrophobic cavity include cyclodextrin, cyclodextrin derivatives, cycloinulohexose, cycloinuloheptose, cycloinulocotose, calyxarene, and cavitand. Cyclodextrin includes (α-cyclodextrin, β-cyclodextrin, and γ-cyclodextrin. Cyclodextrin derivatives refers to α-cyclodextrins, β-cyclodextrins, and γ-cyclodextrins in which at least one hydroxyl group located on the rim of the cyclodextrin ring have been functionalized with a substituent group such as methyl, acetyl, hydroxypropyl, and hydroxyethyl groups. Cyclodextrin derivatives also include cyclodextrin molecules with multiple substituent groups including cyclodextrin molecules with more than one type of substituent group. Cyclodextrin derivatives do not include polymers with more than one attached cyclodextrin ring. Preferred cyclodextrin derivatives are methyl-β-cyclodextrin and hydroxypropyl-β-cyclodextrin. Methyl-β-cyclodextrin is the most preferred cyclodextrin derivative. The amount of macromolecular organic compound having a hydrophobic cavity used in the process disclosed in U.S. Pat. No. 5,521,266 is typically from 0.1 to 50 weight percent, preferably 0.1 to 30 weight percent, and more preferably 0.5 to 10 weight percent based on the total weight of ethylenically unsaturated monomers. The first polymer may also be prepared by emulsion polymerization in the presence of a non-cyclical polysaccharide capable of forming an inclusion compound, as disclosed in WO 98/24821 A2. Suitable non-cyclical polysaccharides include both unmodified polysaccharides and modified polysaccharides which are partially or totally derivatized on the hydroxyl groups.

The emulsion polymer process to prepare the first polymer may also include various synthesis adjuvants known in the art. The monomer mixture containing the hydrophobic monomer may be emulsified with an anionic or nonionic surfactant or dispersing agent, or compatible mixtures thereof such as a mixture of an anionic and nonionic surfactant. Suitable levels range from 0.05% to 5% by weight of surfactant or dispersing agent based on the weight of the monomer mixture.

Suitable anionic dispersing agents include, for example, alkali fatty alcohol sulfates, such as sodium lauryl sulfate; alkali arylalkyl sulfonates, such as potassium isopropylbenzene sulfonate; alkali alkyl sulfosuccinates, such as sodium octyl sulfosuccinate; and alkali arylalkylpolyethoxyethanol sulfates or sulfonates, such as sodium t-octylphenoxypolyethoxyethyl sulfate, having 1 to 5 oxyethylene units.

Suitable nonionic dispersing agents include, for examples, alkyl phenoxypolyethoxy ethanols, having alkyl groups of from 7 to 18 carbon atoms and from 6 to 60 oxyethylene units such as, for example, heptyl phenoxypolyethoxyethanols; ethylene oxide esters of long chain carboxylic acids such as lauric acid, myristic acid, palmitic acid, oleic acid, or mixtures of acids such as those found in tall oil containing from 6 to 60 oxyethylene units; ethylene oxide condensates of long chain alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more propylene oxide sections.

Polymers such as hydroxyethyl cellulose, methyl cellulose, polyacrylic acid, polyvinyl alcohol, may be used as emulsion stabilizers and protective colloids, as is known in the art.

The emulsion polymerization process to prepare the first polymer may be initiated by thermal decomposition of free radical precursors which are capable of generating radicals suitable for initiating addition polymerization such as, for example, ammonium or potassium persulfate. Radicals suitable for initiating addition polymerization may also be generated by using free radical precursors as the oxidizing component of a redox system, which also includes a reducing component such as potassium metabisulfite, sodium thiosulfate, or sodium formaldehyde sulfoxylate. The free radical precursor and reducing agent together, referred to as a redox system herein, may be used at a level of from about 0.001% to 5%, based on the weight of ethylenically unsaturated monomers used. Examples of redox systems include t-butyl hydroperoxide/sodium formaldehyde sulfoxylate/Fe (III) and ammonium persulfate/sodium bisulfite/sodium hydrosulfite/Fe(III). The polymerization temperature may be from 20° C. to 95° C.

In the process utilized for preparing the samples within this application, a first stage was prepared by adding a monomer emulsion and sodium persulfate to a solution containing methyl-β-cyclodextrin, deionized water, and surfactant. The first stage was reacted at 85° C. A second stage was prepared by making a second monomer emulsion and feeding the second monomer emulsion and a sodium persulfate solution to the reacted first stage. The second stage was reacted at 85° C.

The first polymer may have a weight average molecule weight in the range of 50,000 to greater than 2,000,000 as measured by gel permeation chromatography using tetrahydrofuran solvent. The measurements are based on a polymethylmethacrylate equivalent. A preferred weight average molecular weight range for the first polymer is 100,000 to 1,000,000.

The first polymer may be a particle dispersion in a liquid medium. Preferably the first polymer is a particle dispersion in an aqueous medium. The average diameter of the first polymer particle in the particle dispersion may be in the range of 50 nm to 1,000 nm, preferably in the range of 70 nm to 600 nm, and more preferably in the range of 90 nm to 300 nm. By "average diameter" is meant an average determined experimentally by the quasielastic light scattering technique, such as provided, for example, by the Model BI-90 Particle Sizer, of Brookhaven Instruments Corp. The particle dispersion may have an unimodal particle size distribution, or may have a multimodal particle size distribution such as a bimodal distribution.

The first polymer particle may have one or more polymer phases. A suitable morphology for the first polymer particle with two or more phases is a core-shell particle in which the shell phase fully encapsulates the core phase.

The aqueous composition of this invention also contains from 0.1 to 5 weight % of at least one wax, preferably from 0.5 to 4 weight %, and more preferably from 1 to 3 weight %, based on the weight of the aqueous composition. The wax provides wood treated with the aqueous composition of this invention with the property of water beading which is believed to indicate minimum wetting of the wood surface and penetration of the water into the wood. The wax typically provides water beading to the wood surface initially after application and may last for a period as long as 6 months of outdoor exposure after the application of the aqueous composition. The type of wax, the level of wax, and the severity of the exposure conditions may affect the length of this period. Suitable waxes include polyethylene waxes, polypropylene waxes, polytetrafluoroethylene waxes, paraffin waxes, and mixtures thereof. In one embodiment, the aqueous composition contains an oxidized polyolefin wax, such as prepared by the process disclosed in U.S. Pat. No. 6,169,148 B1. The waxes may be provided as emulsions such as anionic wax emulsions, nonionic polyethylene emulsions, nonionic paraffin emulsions, and anionic paraffin/polyethylene emulsions or as powders such as polyethylene powder and modified synthetic wax powder. A preferred wax is anionic paraffin/polyethylene emulsion.

The aqueous composition contains water as the continuous medium. Besides water, the aqueous composition may also contain organic solvents including alcohols such as methanol, ethanol, and isopropanol; and acetone. Preferably, the organic solvent is miscible with water. The aqueous composition preferably contains less than 5 weight % organic solvent, more preferably less than 2 weight % organic solvent, and most preferably less than 1 weight % organic solvent, based on the weight of the aqueous composition. In a preferred embodiment, the aqueous composition does not contain an organic solvent.

The aqueous composition may optionally contain at least one second polymer. The second polymer may be a polymer including ethylenically unsaturated monomers as polymerized units such as acrylic copolymers, vinyl acetate copolymers, ethylene vinyl acetate copolymer, polyvinyl chloride, vinyl chloride copolymers, and styrene butadiene copolymers. The second polymer may be employed in combination with the first polymer of this invention to balance the application properties of the aqueous composition or to provide the desired properties at a lower cost. The second polymer may be a particle dispersion in a liquid medium including emulsion polymers and suspension polymers. Preferably the second polymer is a particle dispersion in an aqueous medium. More preferably, the second polymer is an aqueous emulsion polymer. The average diameter of the second polymer particle in the particle dispersion may be in the range of 50 nm to 1,000 nm, preferably in the range of 70 nm to 600 nm, and more preferably in the range of 90 nm to 300 nm. The particle dispersion may have an unimodal particle size distribution, or may have a multimodal particle size distribution such as a bimodal distribution.

The aqueous composition includes from 2 to 25 weight % of the first polymer, preferably from 4 to 20 weight % of the first polymer, and more preferably from 6 to 18 weight % of the first polymer. The aqueous composition also includes from 0 to 32 weight % of the second polymer, preferably from 4 to 25 weight % of the second polymer, and more preferably from 8 to 20 weight % of the second polymer.

The total polymer level is the sum of the weight % of first polymer and the weight % second polymer, based on the weight of the aqueous composition. As used herein, "weight % of the first polymer" and "weight % of the second polymer" are based on the dry weights of first polymer and the second polymer, respectively. The aqueous composition has a total polymer level of at least 10 weight %, preferably at least 15 weight %, and more preferably, at least 20 weight %. The ratio of first polymer to second polymer in the aqueous composition is at least 1:4, preferably at least 1:2, and most preferably at least 1:1. In one embodiment, the aqueous composition of this invention does not contain the second polymer and contains from 10 to 25 weight % first polymer.

As used herein, the combined glass transition temperature is the "effective" glass transition temperature of the combination of the first polymer and the second polymer. The combined glass transition temperature is calculated from the following equation:

$$\frac{1}{T_g} = \frac{w_1}{T_{g(1)}} + \frac{w_2}{T_{g(2)}}$$

wherein $w_1$ and $w_2$ refer to the weight fraction of the first polymer and the second polymer, respectively, and $T_{g(1)}$ and $T_{g(2)}$ refer to the glass transition temperatures of the first polymer and the second polymer in degrees Kelvin, respectively. For compositions including more than one first polymer or more than one second polymer, additional terms are added ($w_n/T_{g(n)}$). The glass transition temperatures, $T_{g(1)}$ and $T_{g(2)}$, are glass transition temperatures measured by differential scanning calorimetry. In the present invention, the first polymer and the second polymer in combination have a combined glass transition temperature in the range of −5° C. to 20° C. and provide an aqueous composition which is suitable as a stain for wood which is not tacky to the touch and is flexible to changes in the dimensions of the wood. For a first polymer with a glass transition temperature greater than 20° C., the second polymer has a glass transition temperature less than 20° C. For a first polymer with a glass transition temperature below −5° C., the second polymer has a glass transition temperature of greater than −5° C. When the aqueous composition does not contain a second polymer, the combined glass transition temperature is the glass transition temperature of the first polymer. For first polymer or second polymer particles with a core-shell morphology, the glass transition temperature is the glass transition temperature of the shell phase.

The aqueous composition also contains pigment. The aqueous composition may contain from 1 to 20 weight %, preferably from 1 to 5 weight %, and most preferably from 1.5 to 3 weight % of at least one pigment, based on the weight of the aqueous composition. Suitable pigments include carbon black; titanium dioxide, iron pigments such as solid iron oxide; antimony oxide pigments; barium pigments; calcium pigment; zirconium pigments; chromium pigments; magnesium pigments; lead pigments; zinc sulfide; lithopone, phthalo blue, and plastic pigments such as solid bead and microsphere pigments containing voids or versicles. Examples of solid bead pigments include polystyrene and polyninyl chloride beads. Examples of microsphere pigments, which include polymer particles containing one or more voids and vesiculated polymer particles, are disclosed in U.S. Pat. Nos. 4,427,835; 4,920,160; 4,594,363; 4,469,825; 4,468,498; 4,880,842; 4,985,064; 5,157,084; 5,041,464; 5,036,109; 5,409,776; and 5,510,422. In one embodiment, the aqueous composition contains from 1 to 20 weight % pigment, based on the weight of the aqueous composition, and may be used as a semitransparent stain, especially for application onto wood surfaces. A composition containing the first polymer, wax, water, and optionally, the second polymer, but without pigment may be used as a clear finish for wood.

The aqueous composition may also contain other ingredients including extenders such as silica, talc, mica, calcium carbonate, feldspar, and nephylene syenites; dyes; preservatives including biocides, mildewcides and fungicides; plasticizers; coalescents to aid in film formation; adhesion promoters; antifoaming agents; surfactants; and wetting agents such as ethylene glycol, propylene glycol, and dipropylene glycol;. Rheology modifiers may be added to the aqueous composition to modify the rheology and flow. Suitable rheology modifiers include alkali soluble emulsions, hydrophobically modified alkali soluble emulsions, alginates, hydroxyethyl cellulose, hydrophobically modified hydroxyethyl cellulose, hydrophobically modified polyurethanes, acrylamides, and hydrophobically modified polyacrylamides. A rheology modifier may be added at a level of 0 to 5 weight %, preferably at a level of 0.1 to 3 weight %, more preferably from 0.5 to 3 weight %, based on the weight of the aqueous composition. Preferred rheology modifiers include alkali soluble emulsion, hydrophobically modified alkali soluble emulsion, and hydrophobically modified polyurethanes.

The aqueous composition may be applied onto the surface of a substrate by various application methods including spraying, dipping, brushing, curtain coating, and drawdown applicators. Preferred application methods include spraying and brushing. The amount of the aqueous composition applied onto a substrate may vary widely with the type of substrate. For example, the amount applied to wood may depend upon the type of wood and the extent of weathering of the wood. Further, the aqueous composition may be absorbed into the wood and may fill the pores of the wood. Suitable application does not require the formation of a continuous barrier coat to the wood. The aqueous composition may be applied as a single application or as multiple applications.

After application of the aqueous composition onto a substrate, the aqueous composition is dried or is allowed to dry. The substrate including the aqueous composition may be dried by the application of heat or hot air to remove the water. Alternatively, the aqueous composition applied onto a substrate may be allowed to dry at ambient conditions such as a temperature in the range of 10° C. to 50° C. and relative humidity in the range of 0 to 99%. Typical drying times at ambient condition may range from 30 minutes to 4 hours.

Water Beading Test

The water beading test was employed to evaluate the water wetting and penetration of water into wood of wood test panels treated with the example and comparative compositions. The formation of water beads on treated wood test panels was evaluated by first cleaning the test panels with a broom to remove any debris or surface dirt. Next, water droplets were distributed over the surface of the entire test panel. Finally, the amount of beading was observed and rated according to the following scale:

| | |
|---|---|
| 100 | water beading over complete test panel |
| 50 | water sits on top of test panel without forming beads |
| 0 | water is absorbed into panel. |

The resistance to water wetting and penetration of water into the treated wood test panel was considered excellent for ratings of 70, acceptable for ratings of 50 to 69, and unacceptable for ratings below a rating of 50.

The reaction vessel for the preparation of Examples 1–3 was a 5-liter round bottom flask, with four necks, equipped with a mechanical stirrer, a temperature control device, a condenser, monomer and initiator feed lines, and a nitrogen inlet.

EXAMPLE 1

Preparation of a First Polymer with a Glass Transition Temperature of −10.6° C.

Added to the reaction vessel at room temperature were 400 grams (g) deionized water, 14.8 g methyl-β- cyclodextrin (50.8 % active in water), and 22.3 g surfactant (30% active in water). The surfactant was an ethoxylated $C_6$ to $C_{18}$ alkyl ether sulfate having 1 to 40 ethylene oxide groups per molecule. The contents were heated to 85° C., while stirring under nitrogen purge. A monomer emulsion was prepared containing 625 deionized water, 14.6 g surfactant (same as above), 600 g lauryl methacrylate (LMA), 450 g butyl acrylate (BA), 435 g methyl methacrylate (MMA), and 15 g methacrylic acid (MAA).

At 85° C., 3% by weight of the monomer emulsion was introduced into the reaction vessel followed by 0.35% by weight sodium carbonate (based on the total monomer weight) in 25 g deionized water and 0.35% by weight of sodium persulfate (based on the total monomer weight) in 30 g deionized water. After the exotherm subsided, the remainder of the monomer emulsion was fed over a period of three hours together with an initiator solution of 0.05% (based on total monomer weight) of sodium persulfate in 210 g deionized water. The resulting polymer, Example 1, had 49.5 weight % solids, an average particle diameter of 134 nm, and a glass transition temperature of −11.4° C. The composition of polymer of Example 1 was 40LMA/30BA/29MMA/1MAA, on a weight basis.

EXAMPLE 2

Preparation of First Polymer with a Glass Transition Temperature of −56° C.

To the reaction vessel of Example 1, 686.0 grams (g) of deionized water, and 22.1 g of an aqueous β-methyl cyclodextrin solution (51% active) were introduced. The contents of the reaction vessel were heated to 93° C. while being stirred in an atmosphere of nitrogen. In a separate container, a monomer emulsion was prepared from 548.0 g deionized water, 16.0 g of a 28% aqueous solution of sodium lauryl sulfate, 0.13 g of ethylenediamine tetraacetic acid disodium salt, 718.0 g BA, 35.9 g MAA, 704.6 g MMA, 785.3 g LMA, and 6.7 g n-dodecylmercaptan. In a second container, an initiator solution was prepared from 4.9 g ammonium persulfate and 163.0 g deionized water. The following ingredients were added to the reaction vessel: a solution of 1.1 g sodium carbonate dissolved in 31.3 g deionized water, 5.0 g deionized water which was used to wash the sodium carbonate solution container, a solution of 7.35 g ammonium persulfate in 27.4 g deionized water, 5.0 g deionized water which was used to wash the ammonium persulfate solution container, 131.1 g of a 100 nm diameter latex dispersion (45% solids), and 25.0 g deionized water which was used to wash the latex dispersion container. Next, with the contents of the reaction vessel at 83–85° C., the monomer emulsion and the initiator solution were cofed to the reaction vessel while maintaining the contents of the reaction vessel at a temperature of 83–85° C. Upon completion of the feeds, the monomer emulsion container and the initiator solution container were rinsed with 31.0 and 5.0 g deionized water, respectively. The rinse water was added to the reaction vessel. The resulting polymer, Example 2, was formulated with 0.1 weight % benzophenone, based on polymer solids. Example 2, had 55 weight % solids, an average particle diameter of 300 nm, a pH of 7.0, and a glass transition temperature of −5° C. The composition of the polymer of Example 2 was 35LMA/32BA/31.4MMA/1.6MA/ 0.3%nDDM+0.1 benzophenone, on a weight basis.

EXAMPLE 3

Preparation of First Polymer with a Glass Transition Temperature of 18.8° C.

Example 3 was prepared according to the process of Example 1 except the monomer emulsion was prepared containing 625 deionized water, 14.6 g surfactant (same as above), 600 g LMA, 225 g BA, 660 g MMA, and 15 g MAA. The resulting latex, Example 3, had 46.3 weight % solids, an average particle diameter of 138 nm, and a glass transition temperature of 18.8° C. The composition of the polymer of Example 3 was 40LMA/15BA/44MMA/1MAA, on a weight basis.

EXAMPLE 4

Preparation of Aqueous Compositions and Comparative Compositions

Aqueous compositions and comparative compositions were prepared by mixing the materials in the order listed in Tables 4.1a and 4.1b. The aqueous compositions of this invention are AC-1 and AC-2 while the comparative compositions are Comp. A to Comp. K. Also listed in Tables 4.1a and 4.1b are the weight % solids of the first polymer, second polymer, and the total polymer in the aqueous or comparative compositions. Aqueous compositions of this invention contained at least 2 weight % first polymer and at least 10 wt % total polymer.

Materials and their suppliers used in the preparation of the aqueous and comparative composition are:

| Acrylic copolymer | Rhoplex ™ ST-77 | Rohm and Haas Company |
| Acrylic copolymer | Primal ™ AC-337N | Rohm and Haas Company |
| Defoamer | BY ™ -022 | BYK-Chemie |
| Coalescent | Texanol ™ | Eastman Chemical Company |
| Biocide | Rozone ™ 2000 | Rohm and Haas Company |
| Pigment | Huls ™ 888-1045 | Creanova, Inc. |
| RM 1 (3% solution) | Natrosol ™ 250HR | Hercules, Inc. |
| RM 2 (3% solution) | Natroso ™ Plus 330 | Hercules, Inc. |
| Wax | Michemlube ™ 270-R | Michelman, Inc. |

TABLE 4.1a

Preparation of Aqueous Compositions and Comparative Compositions

| Material | AC-1 | AC-2 | Comp. A | Comp. B | Comp. C | Comp. D | Comp. E |
|---|---|---|---|---|---|---|---|
| Exp. 1 (g) | 50.2 | | | | | | |
| Exp. 2 (g) | | 305.4 | | | 153.5 | 305.4 | |
| Exp. 3 (g) | | | 56.5 | | | | 183.4 |
| Rhoplex ST-77 (g) | | | | 163.6 | | | |
| Primal | 138.3 | | | | | | |

TABLE 4.1a-continued

Preparation of Aqueous Compositions and Comparative Compositions

| AC-337N (g) | | | | | | | |
|---|---|---|---|---|---|---|---|
| water (g) | 208.7 | 208.7 | 208.7 | 208.7 | 208.7 | 208.7 | 208.7 |
| ammonia (g) | 1.0 | 1.0 | 1.0 | 1.0 | 1.0 | 1.0 | 1.0 |
| defoamer (g) | 0.3 | 0.3 | 0.3 | 0.3 | 0.3 | 0.3 | 0.3 |
| coalescent (g) | 8.8 | | 8.7 | | | | 8.5 |
| biocide (g) | 4.6 | 4.6 | 4.6 | 4.6 | 4.6 | 4.6 | 4.6 |
| water (g) | | 135.4 | | | 292.2 | 135.4 | |
| pigment (g) | 20.0 | 39.8 | 20.0 | 20.0 | 20.0 | 39.8 | 20.0 |
| RM-1 (g) | 104 | | 104 | 100 | | | 94 |
| RM-2 (g) | | 41.7 | | | 41.7 | 41.7 | |
| ammonia (g) | 1.0 | 1.0 | 1.0 | 1.0 | 1.0 | 1.0 | 1.0 |
| water (g) | 320 | 127.1 | 282 | 352 | 127.1 | 127.1 | 329 |
| wax (g) | 20 | 20 | 20 | | | | |
| $1^{st}$ polymer (wt. %) | 2.83 | 18.98 | 2.98 | 9.50 | 9.93 | 19.39 | 10.0 |
| $2^{nd}$ polymer (wt. %) | 7.18 | 0 | 6.90 | 0 | 0 | 0 | 0 |
| total polymer (wt %) | 10.01 | 18.98 | 9.89 | 9.50 | 9.93 | 19.39 | 10.0 |
| combined $T_g$ (° C.) | 13.5 | −5 | 22.5 | −11.4 | −5 | −5 | 18.8 |

TABLE 4.1b

Preparation of Aqueous Compositions and Comparative Compositions

| Material | Comp. F | Comp. G | Comp. H | Comp. I | Comp. J | Comp. K |
|---|---|---|---|---|---|---|
| Exp. 1 (g) | 50.2 | | 50.2 | | | |
| Exp. 2 (g) | | | | | | |
| Exp. 3 (g) | | 56.5 | | 56.5 | | |
| Rhoplex ST-77 (g) | 163.6 | 163.6 | | | 485.4 | |
| Primal AC-337N (g) | | | 138.3 | 138.3 | | 398.4 |
| water (g) | 208.7 | 208.7 | 208.7 | 208.7 | 208.7 | 208.7 |
| ammonia (g) | 1.0 | 1.0 | 1.0 | 1.0 | 1.0 | 1.0 |
| defoamer (g) | 0.3 | 0.3 | 0.3 | 0.3 | 0.3 | 0.3 |
| coalescent (g) | 8.6 | 8.7 | 8.8 | 8.8 | | 17.9 |
| biocide (g) | 4.6 | 4.6 | 4.6 | 4.6 | 4.6 | 4.6 |
| water (g) | | | | | 51.4 | 85.1 |
| pigment (g) | 20.0 | 20.0 | 20.0 | 20.0 | 39.8 | 39.8 |
| RM-1 (g) | 94 | 104 | 104 | 94.0 | | |
| RM-2 (g) | | | | | 41.7 | 41.7 |
| ammonia (g) | 1.0 | 1.0 | 1.0 | 1.0 | 1.0 | 1.0 |
| water (g) | 300 | 282 | 320 | 320 | 42.2 | 76.2 |
| wax (g) | | | | | 20 | 20 |
| $1^{st}$ polymer (wt. %) | 2.92 | 3.08 | 2.90 | 3.07 | 0 | 0 |
| $2^{nd}$ polymer (wt. %) | 7.10 | 7.12 | 7.34 | 7.38 | 20.04 | 20.26 |
| total polymer (wt %) | 10.02 | 10.20 | 10.24 | 10.44 | 20.04 | 20.26 |
| combined Tg (° C.) | 12.5 | 22.2 | 12.8 | 22.9 | 23.7 | 25 |

A second series of aqueous compositions and comparative compositions were also prepared containing both the first polymer and the second polymer. These compositions were prepared by first preparing a series of primary compositions, PC-A to PC-F, which contained either a first polymer or a second polymer. The primary compositions were then blended in various ratios to prepare the aqueous compositions and comparative compositions. The primary compositions which were used as blend components were prepared by mixing the materials in the order listed in Table 4.2.

TABLE 4.2

Primary Compositions Used to Prepare Aqueous Compositions and Comparative Compositions Containing First Polymer and Second Polymer

| Material | PC-A | PC-B | PC-C | PC-D | PC-E | PC-F |
|---|---|---|---|---|---|---|
| Rhoplex ST-77 (g) | 485.4 | | | 485.4 | | |
| Exp. 2 (g) | | 305.4 | | | 305.4 | |

TABLE 4.2-continued

Primary Compositions Used to Prepare Aqueous Compositions and Comparative Compositions Containing First Polymer and Second Polymer

| Material | PC-A | PC-B | PC-C | PC-D | PC-E | PC-F |
|---|---|---|---|---|---|---|
| Primal AC-337N (g) | | | 398.44 | | | 398.44 |
| water (g) | 208.68 | 208.68 | 208.68 | 208.68 | 208.68 | 208.68 |
| ammonia (g) | 1 | 1 | 1 | 1 | 1 | 1 |
| defoamer (g) | 0.25 | 0.25 | 0.25 | 0.25 | 0.25 | 0.25 |
| coalescent (g) | | | 17.93 | | | 17.93 |
| biocide (g) | 4.55 | 4.55 | 4.55 | 4.55 | 4.55 | 4.55 |
| water (g) | 51.44 | 51.44 | 51.44 | 51.44 | 51.44 | 51.44 |
| pigment (g) | 39.79 | 39.79 | 39.79 | 39.79 | 39.79 | 39.79 |
| RM-1 (g) | 41.74 | 41.74 | 41.74 | 41.74 | 41.74 | 41.74 |
| ammonia (g) | 1 | 1 | 1 | 1 | 1 | 1 |
| water (g) | 42.24 | 127.13 | 76.21 | 42.24 | 127.13 | 76.21 |
| wax (g) | | | | 20 | 20 | 20 |
| 1st polymer (wt. %) | | 19.4 | | | 19.0 | |
| 2nd polymer (wt. %) | 20.5 | | 20.7 | 20.0 | | 20.3 |

The aqueous compositions and the comparative compositions prepared from the primary compositions are listed in Table 4.3, which lists the quantities of the blend components, as weight % of the primary compositions.

TABLE 4.3

Composition of Aqueous Compositions and Comparative Compositions Containing First Polymer and Second Polymer

| Material | Comp. L | AC-3 | Comp. M | AC-4 | Comp. N | AC-5 |
|---|---|---|---|---|---|---|
| PC-A | | 3 | | 1 | | |
| PC-B | 1 | | 1 | | 3 | |
| PB-C | 3 | | | | | |
| PC-D | | | | 3 | | 1 |
| PC-E | | 1 | | 1 | | 3 |
| PC-F | | 3 | | | | |
| 1st polymer (wt. %) | 4.85 | 4.75 | 4.85 | 4.75 | 14.6 | 14.2 |
| 2nd polymer (wt. %) | 15.5 | 15.2 | 15.4 | 15.0 | 5.12 | 5.00 |
| combined Tg (° C.) | 17.3 | 17.3 | 17.2 | 17.2 | 2.2 | 2.2 |

The aqueous compositions of this invention (AC-3 to AC-5) contained wax while the comparative compositions (Comp. L to Comp. N) did not contain wax.

Aqueous compositions AC-1 to AC-5, and comparative compositions A to N were applied to CCA treated southern yellow pine decking boards. The decking boards were 13.3 cm wide, 152 cm long, and 4.4 cm thick and were weathered for 23 months prior to the application of the aqueous compositions. The decking boards were mounted horizontally on an exterior walkway located at Spring House, Pa. The surface of the decking boards were prepared by sweeping to remove dirt and debris. Next, the aqueous compositions were applied to the decking boards by brush. Sufficient quantities of the aqueous composition were applied until the decking board stopped adsorbing the aqueous composition. The treated decking boards were dry to touch in about one hour and were allowed to dry further for at least 12 hours before reopening the exterior walkway to foot traffic.

EXAMPLE 5

Evaluation of Treated Decking Boards

The water beading test was used to evaluate the treated decking boards at periodic intervals. The results are shown in Table 5.1.

TABLE 5.1

Water Beading Test Results for Treated Decking Boards

| Time | AC-1 | AC-2 | Comp. A | Comp. B | Comp. C | Comp. D | Comp. E | Comp. F | Comp. G | Comp. H | Comp. I | Comp. J | Comp. K |
|---|---|---|---|---|---|---|---|---|---|---|---|---|---|
| 1 Day | 100 | 100 | 100 | 30 | 30 | 53 | 30 | 30 | 30 | 30 | 30 | 100 | 100 |
| 5 Days | 97 | 97 | 97 | 30 | 30 | 53 | 30 | 30 | 30 | 30 | 30 | 93 | 100 |
| 7 Days | 97 | 97 | 97 | 30 | 30 | 53 | 30 | 30 | 30 | 30 | 30 | 93 | 100 |
| 14 Days | 97 | 97 | 97 | 40 | 30 | 53 | 33 | 30 | 30 | 30 | 30 | 97 | 100 |
| 20 Days | 100 | 100 | 93 | 30 | 40 | 53 | 30 | 20 | 30 | 30 | 30 | 90 | 100 |
| 27 Days | 100 | 100 | 80 | 30 | 50 | 63 | 30 | 0 | 30 | 50 | 30 | 70 | 100 |
| 35 Days | 100 | 100 | 80 | 30 | 50 | 63 | 30 | 0 | 30 | 50 | 30 | 70 | 100 |
| 50 Days | 90 | 100 | 90 | 30 | 50 | 50 | 30 | 0 | 30 | 50 | 30 | 80 | 100 |
| 80 Days | 90 | 100 | 90 | 30 | 50 | 40 | 30 | 0 | 30 | 30 | 30 | 80 | 90 |
| 3 Months | 70 | 100 | 70 | 30 | 30 | 33 | 30 | 30 | 30 | 20 | 20 | 87 | 80 |
| 4 Months | 50 | 100 | 60 | 30 | 30 | 60 | 30 | 30 | 20 | 20 | 20 | 70 | 60 |
| 5 Months | 60 | 100 | 30 | 30 | 30 | 30 | 30 | 30 | 30 | 30 | 30 | 50 | 50 |
| 6 Months | 50 | 80 | 30 | 30 | 30 | 50 | 30 | 30 | 20 | 20 | 20 | 60 | 50 |

The wood decking boards treated with AC-2, the aqueous composition containing the first polymer but not the second polymer, maintained excellent resistance to water wetting and penetration of water after exterior exposure of 6 months. The wood decking boards treated with the aqueous composition, AC-1, which contained both the first polymer and second polymer, maintained acceptable water resistance after exterior exposure of 6 months. In contrast, wood decking boards treated with many of the comparative compositions had unacceptable water resistance after exterior exposure of 6 months. The results show that the aqueous composition of this invention provides acceptable to excellent resistance to water wetting and penetration of water after exterior exposure for periods of at least 6 months.

TABLE 5.2

Water Beading Test Results for Treated Decking Boards
Containing Blends of First Polymer and Second Polymer

| Time | Comp. L | AC-3 | Comp. M | AC-4 | Comp. N | AC-5 |
|---|---|---|---|---|---|---|
| 1 Day | 40 | 100 | 30 | 100 | 30 | 100 |
| 5 Days | 40 | 100 | 30 | 100 | 20 | 100 |
| 10 Days | 40 | 100 | 30 | 100 | 30 | 100 |
| 14 Days | 50 | 100 | 40 | 100 | 47 | 100 |
| 1 Month | 50 | 100 | 50 | 100 | 50 | 100 |
| 1.5 Months | 30 | 80 | 30 | 50 | 30 | 50 |
| 3 Months | 30 | 100 | 30 | 100 | 30 | 100 |
| 4 Months | 30 | 80 | 30 | 100 | 30 | 70 |
| 5 Months | 30 | 70 | 30 | 90 | 30 | 70 |
| 6 Months | 30 | 50 | 30 | 70 | 30 | 60 |

The results in Table 5.2 show that aqueous compositions AC-3 to AC-5, which contained blends of the first polymer and the second polymer, and also including wax, had acceptable or better resistance to water after 6 months exterior exposure. In contrast, the comparative compositions, Comp. L and Comp. N, which contained the first polymer and the second polymer but did not include wax, had unacceptable resistance to water wetting and penetration of water during most of the evaluation period. The results show that the aqueous composition of this invention provides acceptable to excellent resistance to water wetting and penetration of water after exterior exposure for periods of at least 6 months.

We claim:

1. An aqueous composition comprising:
   a) from 2 to 25 weight % first polymer, based on weight of said aqueous composition, wherein said first polymer comprises as polymerized units:
      i) from 20 to 100 weight % of at least one $C_{12}$ to $C_{40}$ alkyl ester of (meth)acrylic acid, based on weight of said first polymer;
      ii) from 0 to 10 weight % of at least one ethylenically unsaturated acid or amide containing monomer or salts thereof, based on weight of said first polymer; and
      iii) from 0 to 80 weight % of at least one ethylenically unsaturated monomer, based on weight of said first polymer;
   b) from 0.1 to 5 weight % of at least one wax, based on weight of said aqueous composition;
   c) from 1 to 20 weight % of at least one pigment, based on weight of said aqueous composition; and
   d) from 0 to 32 weight % of at least one second polymer, based on weight of said aqueous composition;
   wherein the sum of said first polymer and said second polymer is at least 10 weight %, based on weight of said aqueous composition;
   wherein the weight ratio of said first polymer to said second polymer is at least 1:4; and wherein said first polymer and said second polymer have a combined glass transition temperature in the range of −5 to 20° C.

2. The aqueous composition of claim 1 wherein said first polymer comprises as polymerized units from 1 to 5 weight % of said at least one ethylenically unsaturated acid or amide containing monomer or salts thereof, based on weight of said first polymer.

3. The aqueous composition of claim 1 wherein the level of said second polymer is 0 weight %, based on weight of said aqueous composition.

4. The aqueous composition of claim 1, claim 2, or claim 3 wherein said first polymer is prepared by emulsion polymerization.

5. The aqueous composition of claim 4 wherein said first polymer is prepared in the presence of a macromolecular organic compound having a hydrophobic cavity, wherein said macromolecular organic compound having a hydrophobic cavity is selected from the group consisting of cyclodextrin, cyclodextrin derivatives, cycloinulohexose, cycloinuloheptose, cycloinuloctose, calyxarene, and cavitand.

6. A method of treating a wood surface comprising the steps of:
   a) preparing an aqueous composition comprising:
      i) from 2 to 25 weight % first polymer, based on weight of said aqueous composition, wherein said first polymer comprises as polymerized units: from 20 to 100 weight % of at least one $C_{12}$ to $C_{40}$ alkyl ester of (meth)acrylic acid, based on weight of said first polymer; from 0 to 10 weight % of at least one ethylenically unsaturated acid or amide containing monomer or salts thereof, based on weight of said first polymer; and from 0 to 80 weight % of at least one ethylenically unsaturated monomer, based on weight of said first polymer;
      ii) from 0.1 to 5 weight % of at least one wax, based on weight of said aqueous composition;
      iii) from 1 to 20 weight % of at least one pigment, based on weight of said aqueous composition; and
      iv) from 0 to 32 weight % of at least one second polymer, based on weight of said aqueous composition; wherein the sum of said first polymer and said second polymer is at least 10 weight %, based on weight of said aqueous composition; wherein the weight ratio of said first polymer to said second polymer is at least 1:4; and wherein said first polymer and said second polymer have a combined glass transition temperature in the range of −5 to 20° C.;
   b) applying said aqueous composition onto said wood surface; and
   c) drying or allowing to dry said aqueous composition.

7. The method of claim 6 wherein said first polymer comprises as polymerized units from 1 to 5 weight % of said at least one ethylenically unsaturated acid or amide containing monomer or salts thereof, based on weight of said first polymer.

8. The method of claim 6 wherein the level of said second polymer is 0 weight %, based on weight of said aqueous composition.

9. The method of claim 6, claim 7, or claim 8 wherein said first polymer is prepared by emulsion polymerization.

10. The method of claim 9 wherein said first polymer is prepared in the presence of a macromolecular organic compound having a hydrophobic cavity, wherein said macromolecular organic compound having a hydrophobic cavity is selected from the group consisting of cyclodextrin, cyclodextrin derivative, cycloinulohexose, cycloinuloheptose, cycloinuloctose, calyxarene, and cavitand.

* * * * *